(12) United States Patent
Mukherjee et al.

(10) Patent No.: US 9,541,965 B1
(45) Date of Patent: Jan. 10, 2017

(54) COVER ASSEMBLY FOR A DISPLAY STACK

(71) Applicant: Amazon Technologies, Inc., Reno, NV (US)

(72) Inventors: Debanjan Mukherjee, San Jose, CA (US); Anoop Menon, Capitola, CA (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 14/202,712

(22) Filed: Mar. 10, 2014

(51) Int. Cl.
*G02F 1/1335* (2006.01)
*G06F 1/16* (2006.01)

(52) U.S. Cl.
CPC .................... *G06F 1/169* (2013.01)

(58) Field of Classification Search
CPC ............... G06F 3/041; G06F 3/0412; G06F 2001/133616; G06F 3/044; G06F 3/045; G06F 1/13338; G06F 1/133615
USPC .............................. 349/12, 63; 345/173, 174
See application file for complete search history.

(56) References Cited

U.S. PATENT DOCUMENTS

| | | | |
|---|---|---|---|
| 2004/0017362 A1 | 1/2004 | Mulligan et al. | |
| 2006/0132453 A1* | 6/2006 | Boyd | G02B 6/0023 345/173 |
| 2013/0256105 A1* | 10/2013 | Lim | G06F 3/044 200/275 |
| 2014/0028584 A1* | 1/2014 | Park | G06F 3/041 345/173 |
| 2014/0240619 A1* | 8/2014 | Yokohama | G06F 3/044 349/12 |

OTHER PUBLICATIONS

Harris, Mike, White Paper: "Sunlight Readability and Durability of Projected Capacitive Touch Displays for Outdoor Applications," Ocular LCD, Inc., 6 pgs.

* cited by examiner

*Primary Examiner* — Nathanael R Briggs
(74) *Attorney, Agent, or Firm* — Lee & Hayes, PLLC

(57) ABSTRACT

Describe herein are electronic devices that includes a display stack having a cover component atop a lightguide component and a display component below the lightguide component. In some instances, the cover component including an antiglare layer having at least some antiglare properties applied to a top surface of a substrate and a touch pattern applied to a bottom surface of the substrate. In some cases, the touch pattern is a single layer multi-touch pattern connected to a touch controller to from a touch sensor capable of detecting the location of an object proximate to antiglare layer.

20 Claims, 10 Drawing Sheets

900

```
┌─────────────────────────────────────────────────────────────┐
│   APPLY AN ANTIGLARE MATERIAL TO A FIRST SIDE OF A SUBSTRATE │
│                             902                              │
└─────────────────────────────────────────────────────────────┘
                              │
                              ▼
┌─────────────────────────────────────────────────────────────┐
│   APPLY A CONDUCTIVE MATERIAL TO A SECOND SIDE OF THE SUBSTRATE │
│                             904                              │
└─────────────────────────────────────────────────────────────┘
                              │
                              ▼
┌─────────────────────────────────────────────────────────────┐
│ ETCH A SINGLE LAYER MULTI- TOUCH PATTERN FROM THE CONDUCTIVE MATERIAL │
│        APPLIED TO THE SECOND SIDE OF THE SUBSTRATE           │
│                             906                              │
└─────────────────────────────────────────────────────────────┘
```

Fig. 9

COVER ASSEMBLY FOR A DISPLAY STACK

BACKGROUND

A large and growing population of users is enjoying entertainment through the consumption of digital content, such as music, movies, images, electronic books, and so on. The users employ various devices with electronic displays such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth to view the digital content. Electronic displays may present various types of information, such as user interfaces, device operational status, digital content items, and the like, depending on the kind and purpose of the associated device. The appearance and quality of a display can affect the user's experience with the electronic device and the content presented thereon. Accordingly, finding ways to enhance user experience and satisfaction continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 9 illustrates an example flow diagram showing an illustrative process for forming the cover component of the display stack of FIGS. 1-3.

DETAILED DESCRIPTION

Figure 1:
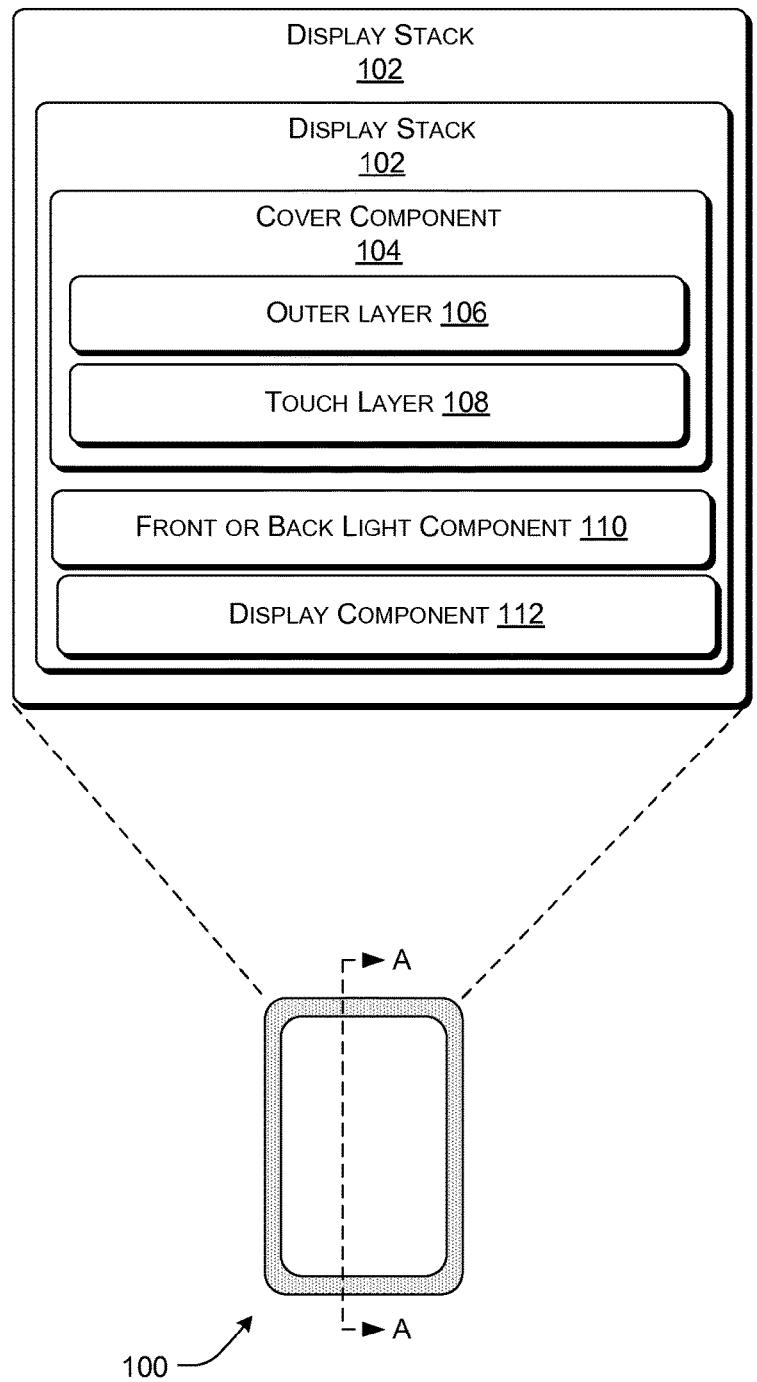
FIG. 1 illustrates an example electronic device including a display stack.

This disclosure describes, in part, electronic devices that include electronic displays for rendering digital content to one or more users. In some particular, this disclosure describes ways to provide a thinner, lighter, and/or cheaper electronic device. For example, in some implementations, an outer antiglare layer and a touch sensor layer are integrated with a single substrate during the fabrication of the display stack. In other implementations, the outer antiglare layer and the touch sensor layer may each be integrated with individual substrates that may be laminated into a single cover component of the display stack.

In general, a display stack has a number of layers, including a number of substrates and one or more adhesive layers to bond the substrates. For example, a display stack may include a display component/unit that displays content. Additionally, a number of additional substrates may be stacked on top of the display component/unit. To illustrate, a display stack may include a touch layer that generates signals in response to an input device contacting the display stack. In some cases, a substrate of the display stack may include an outer layer located at the top of the display stack to protect other substrates of the display stack. The display stack may also include a lighting component, such as a front-side lighting component or a backlight lighting component to provide light to view the content displayed by the display component.

In one implementation, the cover component may include the outer layer and the touch layer. For instance, the cover component may be formed by applying the outer layer to a top surface a glass or plastic substrate and a conductive material to a bottom surface of the substrate. In one example, the outer layer may be formed by coating the top surface of the substrate with a material having antiglare proprieties, antireflective properties, anti-smudging or anti-fingerprinting properties, anti-cracking properties, among others. In other examples, the outer layer may be an antiglare film that is applied to the top surface of the substrate, for instance, using an optically clear adhesive (OCA).

The touch layer may be formed by coating the bottom surface of the substrate with a conductive material and selectively etching a touch pattern from the conductive material. In other examples, a metal mesh or pre-formed touch pattern may be adhered or laminated to the bottom surface of the substrate to from the touch layer. In still other examples, the touch layer may be printed upon the bottom surface of the substrate. In some instances, the touch layer may be formed from a copper or copper-based alloy, silicon or a silicon-based alloy, gold or a gold-based alloy, sliver a sliver-based alloy, carbon or a carbon-based alloy, among others. In some particular examples, the touch layer may be formed from Indium tin oxide (ITO), carbon nanotubes, and/or silver nanowiring.

In another implementation, the cover component may be formed by applying the outer layer or the antiglare material to a top surface of first substrate and the conductive material or metal mesh to a bottom surface of a second substrate. For example, the top surface of the first substrate may be coated, sprayed, or dipped in the antiglare material having antiglare proprieties, antireflective properties, anti-smudging or anti-fingerprinting properties, anti-cracking properties, among others, as described above. The bottom surface of the second substrate may be coated, sprayed, or dipped in the conductive material from which a touch pattern may etched. Once the antiglare material is applied to the first substrate and the touch pattern is etched or applied to the second substrate, the first and second substrates may be laminated together to form the cover component of the display stack.

In some particular implementations, a single layer multi-touch pattern may be utilized. By utilizing a single layer touch pattern in lieu of a multi layer touch pattern, the touch pattern may be applied to a single side of a single substrate and/or may be etched from a single layer of a conductive material. In this implementation, the second substrate may be removed from the display stack and the lamination process of the cover portion may be forgone during fabrication resulting in a cheaper, thinner, and optically improved display.

In some instances, the substrate upon which the antiglare coating and the touch pattern is applied may be a substantially clear plastic. In this instance, the cover component may become flexible and, thus, may be applied to a curved surface to form a curved display, such as may be found on a wrist watch. Additionally, by utilizing a single layer touch pattern on the clear plastic substrate the flexibility of the cover component is improved, as the overall thickness of the cover component may be reduced. In some particular implementations, the flexibility of the cover component may be further improved by using a silver nanowiring to from the touch pattern, as silver nanowiring is less prone to cracking than other typical materials used in touch sensor designs.

FIG. 1 illustrates an example electronic device 100 including a display stack 102, as shown along lines A-A. In general, the display stack 102 includes a cover component 104, a front or back light component 110, and a display component 112. In one implementation, the cover component 104 includes at least one substantially transparent substrate, an outer layer 106, and a touch layer 108. For example, the outer layer 106 is formed by applying an antiglare coating or film to a top surface of the substrate and the touch layer is formed by coating a bottom surface of the substrate with a conductive material and selectively etching the touch pattern from the conductive material. In other examples, the touch pattern may be a conductive metal mesh technology that may be adhered to the bottom surface of the substrate.

In another implementation, the cover component 104 may be formed from a first portion including a first substrate and the outer layer 106 and a second portion including a second substrate and the touch layer 108. For example, the first portion may be formed by applying the antiglare coating or film to a top surface of the first substrate and the second portion may be formed by coating and etching a touch pattern from a bottom surface of the second substrate. The cover component 104 may be fashioned by lamenting the first portion and the second portion together, such that the cover component 104 includes from top surface of the electronic device 100 down: the outer layer 106, a first substrate, the second substrate, and the touch layer 108.

In some examples, the antiglare coating or film may have antiglare proprieties, antireflective properties, anti-smudging or anti-fingerprinting properties, anti-cracking properties, among others. In some specific instances, the antiglare coating or film may be a polyester material, a polycarbonate material, or a combination material. In some instances, the outer layer 106 may be a film manufactured with additives such that the resulting film includes a hardness rating that is greater than a predefined threshold. In this way, the cover component 104 may have an outer surface that is resistant to scratches caused by objects having a hardness rating less than the predefined threshold (e.g., at least a hardness rating that is resistant to a 3h pencil). In other instances, the outer layer 106 may include an ultra-violate (UV) filter, a UV-absorbing dye, or the like, for protecting components in the display stack 102 from UV light.

In some examples, the touch layer 108 may be formed from a copper or copper-based alloy, silicon or a silicon-based alloy, gold or a gold-based alloy, sliver a sliver-based alloy, carbon or a carbon-based alloy, among others. In some particular examples, the touch layer may be formed from Indium tin oxide (ITO), carbon nanotubes, and/or silver nanowiring. For instance, the bottom surface of the substrate may be coated or sprayed with the selected conductive material and a touch pattern, such as a single layer touch pattern, may be etched from the resulting material. In other examples, the conductive material forming the touch layer 108 may be printed upon the bottom surface of the substrate or a metal mesh or wiring may be adhered to or traced on the bottom surface of the substrate to form the touch layer 108.

In some instances, the substrate may be formed from a clear glass. In other instances, the substrate may be formed from a substantially clear plastic. In the instance that the substrate is formed from a substantially clear plastic, the cover component 104 may be flexible, such that the cover component 104 may be integrated into a curved display. For example, in addition the enhanced flexibility provided by the inherent properties of the plastic material, a plastic substrate may be manufactured in the range of 0.2-0.25 mm in width, while similar glass substrates typically have a width of 0.5 mm. Further, the overall flexibility of the cover component 104 may be improved by utilizing a single substrate and/or a single layer multi-touch pattern, as described herein.

The electronic device 100 may also include a front or back light component 110 for lighting the display stack 102. The front or back light component 110 may include a light guide portion and a light source. The light guide portion can include a substrate including a transparent thermoplastic polymer. For example, the light guide portion may include a substrate, a layer of lacquer and multiple grating elements formed in the layer of lacquer. The multiple grating elements may be configured to propagate light to illuminate the display component 112.

The display stack 102 also includes a display component 112. In various examples, the display component 112 may include a reflective display, such as an electronic paper display, a reflective liquid crystal display (LCD), or the like. Electronic paper displays represent an array of display technologies that can mimic the look of ordinary ink on paper. In contrast to backlit displays, electronic paper displays typically reflect light, much as ordinary paper does. In addition, electronic paper displays can be bi-stable, meaning that these displays are capable of holding text or other rendered images even when very little or no power is supplied to the display. Some examples of the display component 112 that can be used with the implementations described herein include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of electronic devices 100, the display component 112 may include an active display such as a LCD, a plasma display, a light emitting diode (LED) display, an organic light emitting diode (OLED) display, and so forth. Accordingly, implementations herein are not limited to any particular display technology.

In an illustrative implementation, the display stack 102 may be formed by combining a number of substrates and/or components one atop the other. For instance, FIGS. 2, 3, and 4 described below, illustrate example schematic cross-section of the display stack 102 including a number of layers taken along line A-A of FIG. 1.

Figure 2:
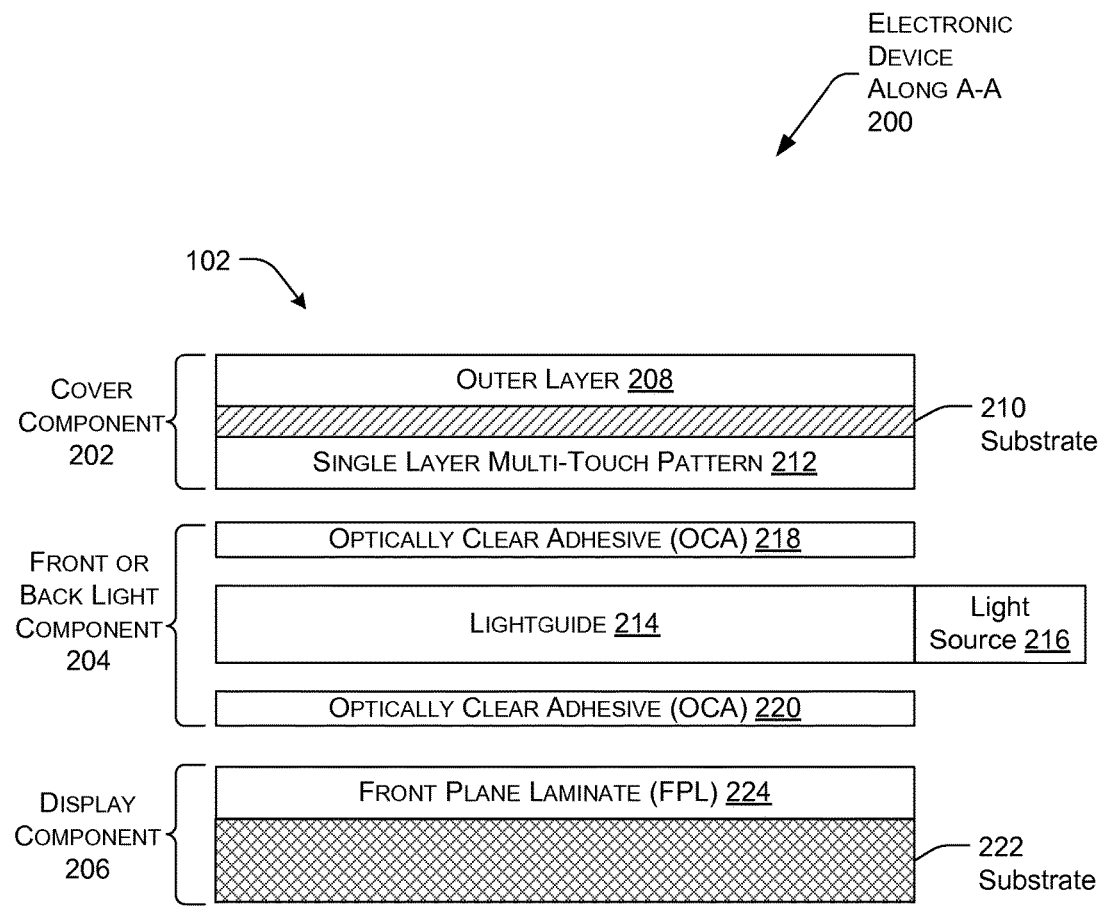
FIG. 2 illustrates an example schematic cross-section of the electronic device of FIG. 1.

FIG. 2 illustrates a first example of a schematic cross-section 200 of the electronic device 100 along the line A-A from FIG. 1. The cross-section 200 illustrates the display stack 102 of FIG. 1 including individual layers of a cover component 202 residing atop a front or back light component 204, which resides atop a display component 206. In the illustrated example, the cover component 202 includes an outer layer 208 (or antiglare layer) applied to a top surface of a substrate 210 and a single layer multi-touch pattern 212 applied to a bottom surface of the substrate 210. In some cases, the single layer multi-touch pattern 212 may also be electronically connected to touch controller (not shown), for example, directly or via a flexible circuit to from a touch sensor or touch enabled display capable of both presenting content and receiving user inputs related to the presented content.

The outer layer 208 may be formed by applying an antiglare coating or film to a top surface of a substrate 210. For example, the top surface of the substrate 210 may be coated or dipped in the antiglare coating which may be cooled or UV-cured. In other examples, an antiglare film may be adhered to the top surface of the substrate 210, for instance, using an OCA, LOCA, or SOCA. The antiglare coating or film may also have proprieties in addition to antiglare proprieties, such as antireflective properties, anti-smudging or anti-fingerprinting properties, anti-cracking properties, among others. In some specific instances, the antiglare coating or film may be a polyester material, a polycarbonate material, or a combination material. In some instances, the outer layer 208 may be a manufactured with additives such that the resulting surface includes a hardness rating that is greater than a predefined threshold. In this way, the cover component 202 may have an outer surface that is resistant to scratches caused by objects having a hardness rating less than the predefined threshold (e.g., at least a hardness rating that is resistant to a 3h pencil). In other instances, the outer layer 208 may include an ultra-violate (UV) filter, a UV-absorbing dye, or the like, for protecting components in the display stack 102 from UV light.

In general, a touch sensor includes a touch pattern (e.g., rows and columns in a grid or diamond shape) and a touch controller. However, unlike traditional touch sensors that typically include a touch component located directly atop the display component 206 and include a first layer (e.g., the rows) applied to a bottom surface of a glass substrate and a second layer (e.g., the columns) applied to a top surface of the glass substrate, the touch sensor described above, may include a single layer multi-touch pattern 212 (e.g., both the rows and columns) applied to a single side (e.g., the underside) of a single substrate 210 that forms part of the cover component 202 residing adjacent to the outer surface of the display stack 102.

The single layer multi-touch pattern 212 may include traces made from ITO, copper, printed ink, metal mesh technologies, sliver nanowires, carbon nanotubes, or the like applied to a bottom surface of the substrate 210. For example, the single layer multi-touch pattern 212 may be formed by coating the bottom surface of the substrate 210 with a conductive material and selectively etching the touch pattern 212 from the conductive material, gluing or laminating a metal mesh or pre-formed touch pattern 212 to the bottom surface of the substrate 210, or directly printing the touch pattern 212 onto the bottom surface of the substrate 210. Furthermore, in some instances the single layer multi-touch pattern 212 may include a transparent conductor other than, or in addition to those described above.

In some implementations, to protect the single layer multi-touch pattern 212 additional dielectric materials may be incorporated into the outer layer 208 above the touch pattern 212. For example, an acrylic material may reside atop the substrate 210 for protection, with this a color of this acrylic layer being tuned to ensure that a resulting color of the display stack 102 viewed by a user is correct. The outer layer 208 may provide additional protection for the single layer multi-touch pattern 212, for example, in the form an antiglare coating or film and having antiglare proprieties, antireflective properties, anti-smudging or anti-fingerprinting properties, and/or anti-cracking properties. Furthermore, the touch pattern layer may be filled with an OCA when joined with the front or back light component 204 (discussed below), which substantially eliminates the opportunity for air gaps to form around or near the material used to from the single layer multi-touch pattern 212 which improves the overall efficacy and accuracy of the resulting touch sensor.

In some instances, the substrate 210 may be a substantially clear glass substrate. In other instances, the substrate may be formed from a substantially clear plastic. In the instance that the substrate is formed from a plastic, the cover component 202 may become flexible, such that the cover component 202 may be integrated into a curved display. For example, in addition the enhanced flexibility provided by the inherent properties of the plastic substrate 210, the plastic substrate 210 may be manufactured in the range of 0.2-0.25 mm in width opposed to similar glass substrates that typically have a width of 0.5 mm. Further, the overall flexibility of the cover component 202 is enhanced in the illustrated example, as the illustrated example includes a single layer multi-touch pattern 212. By utilizing a single layer multi-touch pattern 212 the overall thickness of the cover component 202 and the display stack 102 may be reduced further. Additionally, it should be understood that, because the electronic device 100 includes a touch sensor that is closer to a user's fingers (e.g., part of the cover component 202 rather than residing atop the display component 206), the touch sensor of the electronic device 100 may be more effective than traditional designs.

The front or back light component 204 generally includes a lightguide 214 connected to a light source 216. The lightguide 214 as illustrated is surrounded on the top and bottom by a layer of OCA 218 and 220, respectively. The lightguide 214 may include a substrate (not shown) formed from a transparent thermoplastic (such as PMMA), a layer of lacquer and multiple grating elements that function to propagate light from the light source 216 towards the top surface of the display stack 102, thus illuminating the content presented on the display. For example, the lightguide 214 may be formed by applying a layer of lacquer to the substrate to create the grating elements of the lightguide 214, the grating elements may be embossed to the layer of lacquer, and the lightguide 214 may be UV-cured. Alternatively, the substrate of the lightguide 214 and the grating elements may be manufactured as a single element, such as via an injection molding process. In some instances, the UV lacquer is made of a cross-linked, tri-functional polymer material that co-polymerizes to a plastic solid when exposed to a high-intensity UV light source.

In some implementations, the light source 216 may be connected to a flexible printed circuit (FPC) to control the quality and volume of light generated. In some instances, the light source 216 (e.g., one or more LEDs) may connected to the FPC via one of the OCA layers 218 or 220. For example, the FPC may be connected to the light source 216 via a solid strip of SOCA or the like. The FPC may also be connected to the lightguide 214 via the OCA. In some instances, the FPC may include a light-diffusing reflective coating (e.g., in the form of a white matte finish), which may help to diffuse and reflect light from the light source 216 and, hence, increase the uniformity of the light across the front of the display screen.

The LEDs selected for inclusion in the light source 216 may have a color that is optimized for the type of display being used. For instance, multiple different color temperature LEDs having particular color ratios there between may be selected to ensure a proper color from the collection of LEDs when lighting the display. Furthermore, the color of the LEDs may be tuned over time to compensate for changes in the lightguide 214, as well based on other factors, such as the aging of the LEDs.

The layers of OCA 218 and 220 above and below the lightguide 214 help maintain the light generated by the light source 216 within the lightguide 214, as well as to join the cover component 202 and the display component 206 with the front or back light component 204. In general, an OCA, such as an LOCA or SOCA, may be applied by depositing the OCA onto the lightguide 214 and, when the OCA reaches the corners of the display stack 102, the corners may be UV-cured. Thereafter, the OCA on the remaining portion of the lightguide 214 may be UV-cured. In other instance, the LOCA or the SOCA may be formed from an acrylic material and/or, in some instances, from silicone. For instance, the LOCA may comprise Loctite® 6192 and/or MSDS made by Nalax3®. The MSDS comprises UV-curable polyurethane acrylates based a formulation comprising of hexamethylene diacrylate, Urethane acrykate oligomer, Acyrlate ester and photoinitator. This formulation may achieve balanced coating properties such as tensile properties, hardness, weatherability, and adhesion. The LOCA may be created by applying the formulation to PMMA rolls using a wet coating method immediately followed by embossing and UV curing (e.g., using a Fusion lamp). In addition, to the OCA layers 218 and 220 a white tape or other type of light-diffusing reflective coating may be laid along a perimeter of the light guide 214, which again may help to diffuse light from the light source 216 and increase the uniformity of the light from the light source 216.

In the illustrated example, the front or back light component 204 resides atop the display component 206. In the illustrated example, the display component includes a substrate 222 and a front plane laminate (FPL) 224. In some instances, the FPL 224 includes e-ink capsules, as well as the fluid in which the capsules move up or down in as described above with reference to electronic-paper displays. However, in other implementations, the display component 206 may present content via one or more other image producing technologies. For example, the display component 206 may include other types of emissive or reflective displays, such as an electronic paper display, a LCD, or the like. Thus, in some implementations, the display component 206 may include bi-stable LCDs, MEMS components, interferometric modulator components, cholesteric components, electrophoretic components, electrofluidic pixel components, electrowetting components, photonic ink components, gyricon components, LCD components, plasma display components, LED components, OLED components, and so forth.

Figure 3:
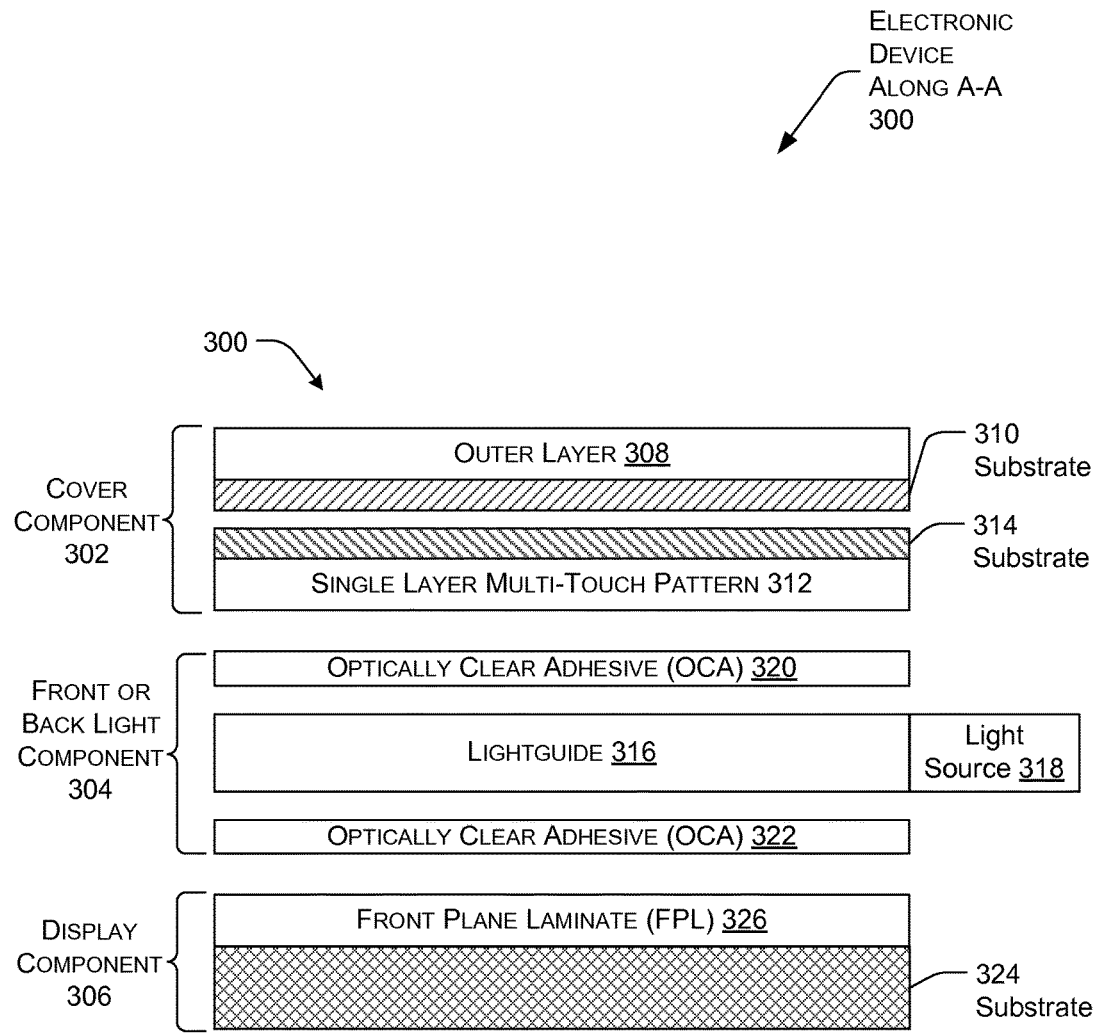
FIG. 3 illustrates another example schematic cross-section of the electronic device of FIG. 1.

FIG. 3 illustrates a second example schematic cross-section 300 of the electronic device 100 across the line A-A from FIG. 1. The cross-section 300 illustrates the display stack 102 of FIG. 1 including individual layers of a cover component 302 residing atop a front or back light component 304, which resides atop a display component 306. In the illustrated example, the cover component 302 includes an outer layer 308 (or antiglare layer) applied to a top surface of a first substrate 310 and a single layer multi-touch pattern 312 applied to a bottom surface of a second substrate 314. In some cases, the single layer multi-touch pattern 312 may also be electronically connected to touch controller, for example, via a flexible circuit to from a touch sensor or touch enabled display capable of both presenting content and receiving user inputs related to the presented content.

In the illustrated example of FIG. 3, the outer layer 308 may be formed by applying an antiglare coating or film to a top surface of the first substrate 310. For example, the top surface of the first substrate 310 may be coated or dipped in the antiglare coating which may be cooled or UV-cured. In other examples, an antiglare film may be adhered to the top surface of the first substrate 310, for instance, using an OCA, LOCA, or SOCA. The antiglare coating or film may also have proprieties in addition to antiglare proprieties, such as antireflective properties, anti-smudging or anti-fingerprinting properties, anti-cracking properties, among others. In some specific instances, the antiglare coating or film may be a polyester material, a polycarbonate material, or a combination material. As described above, the outer layer 308 may be a manufactured with additives such that the resulting surface includes a hardness rating that is greater than a predefined threshold. In this way, the cover component 302 may have an outer surface that is resistant to scratches.

In this example, the single layer multi-touch pattern 312 may be formed by coating the bottom surface of the second substrate 314 with a conductive material and selectively etching the touch pattern 312 from the conductive material, gluing or laminating a metal mesh or pre-formed touch pattern 312 to the bottom surface of the second substrate 314, or directly printing the touch pattern 312 onto the bottom surface of the second substrate 314.

The first substrate 310 and the second substrate 314 may be laminated together to form the completed cover component 302. For example, the first and second substrates 314 may be lamented via processes, such as applying heat and/or pressure to permanently join the first substrate 310 and the second substrates 314 and/or an adhesive (such as an OCA) may be applied between the first and second substrate and UV-cured or hardened. In some instances, the first substrate 310 and the second substrates 314 may be a substantially clear glass or plastic material. In one particular instance, the first substrate 310 may be a glass substrate and the second substrate may be a plastic substrate or vice versa. If the first substrate 310 and the second substrates 314 are formed from a plastic, the cover component 302 may become flexible, such that the cover component 302 may be integrated into a curved or flexible display. For example, to form a display being at least somewhat depressible for receiving user inputs in a manner other than via a touch sensor.

In the illustrated example, the display stack 102 also includes the front or back light component 304, which generally incorporates a lightguide 316 connected to a light source 318 surrounded on the top and bottom by a layer of OCA 320 and 322, as described above with respect to FIG. 2. The lightguide 316 may include a substrate (not shown) formed from a transparent thermoplastic (such as PMMA), a layer of lacquer and multiple grating elements that function to propagate light from the light source 318 towards the top surface of the display stack 102, thus illuminating the content presented on the display. The layers of OCA 320 and 322 reside above and below the lightguide 316 to help maintain the light generated by the light source 318 within the lightguide 316, as well as to join the cover component 302 and the display component 306 with the front or back light component 304.

In the illustrated example, the front or back light component 304 resides atop the display component 306, which includes a substrate 324 and FPL 326. In some instances, the FPL 326 includes e-ink capsules, as well as the fluid in which the capsules move up or down in as described above with reference to electronic-paper displays. In addition, the FPL 326 may include a plastic film structure onto which the e-ink is coated using a roll-to-roll process. Thereafter, a conductive transparent electrode plastic film may be combined with an adhesive layer and a release sheet to form one implementation of the FPL 326.

Figure 4:
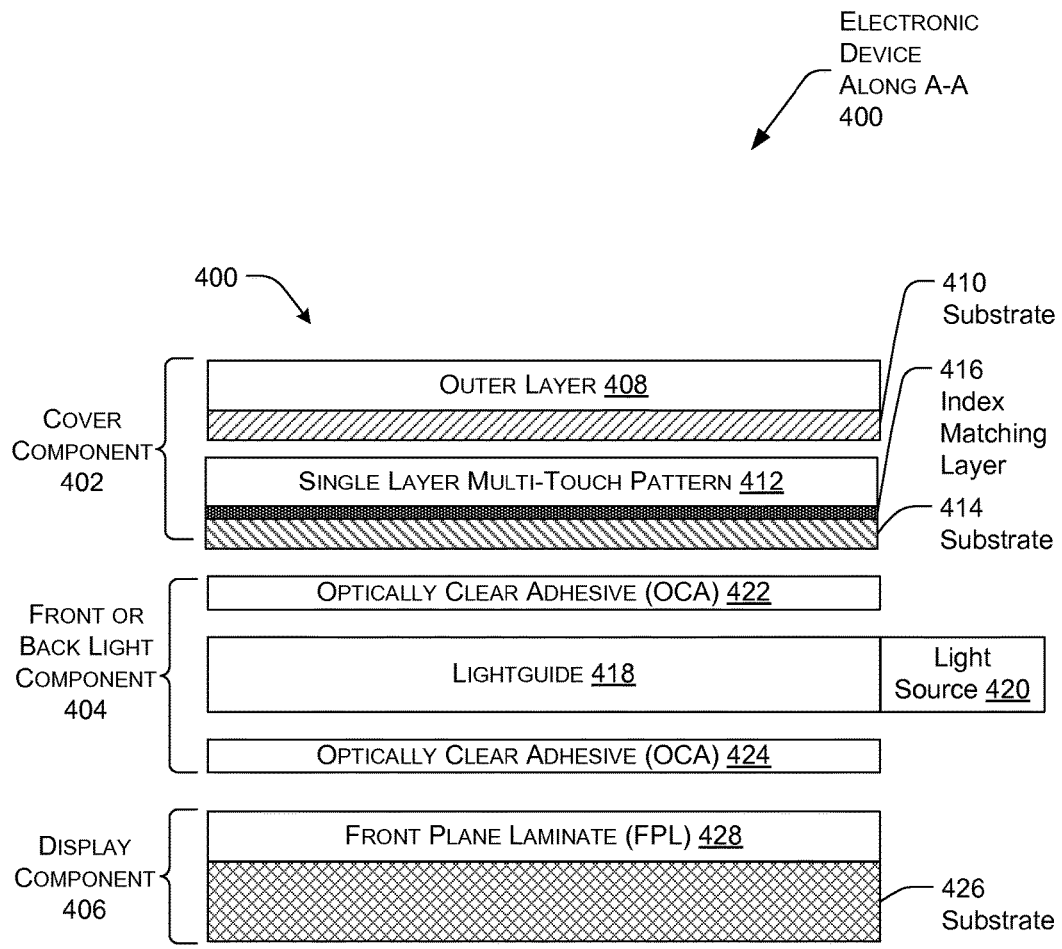
FIG. 4 illustrates another example schematic cross-section of the electronic device of FIG. 1.

FIG. 4 illustrates a third example schematic cross-section 400 of the electronic device 100 across the line A-A from FIG. 1. The cross-section 400 illustrates the display stack 102 of FIG. 1 including individual layers of a cover component 402 residing atop a front or back light component 404, which resides atop a display component 406. In the illustrated example, the cover component 402 includes an outer layer 408 (or antiglare layer) applied to a top surface of a first substrate 410 and a single layer multi-touch pattern 412 applied to a top surface of a second substrate 414. In some cases, the single layer multi-touch pattern 312 may also be electronically connected to touch controller, for example, via a flexible circuit to from a touch sensor or touch enabled display capable of both presenting content and receiving user inputs related to the presented content.

In the illustrated example of FIG. 4, the outer layer 408 may be formed by applying an antiglare coating or film to a top surface of the first substrate 410. For example, the top surface of the first substrate 410 may be coated or dipped in the antiglare coating which may be cooled or UV-cured. In other examples, an antiglare film may be adhered to the top surface of the first substrate 410, for instance, using an OCA, LOCA, or SOCA. The antiglare coating or film may also have proprieties in addition to antiglare proprieties, such as antireflective properties, anti-smudging or anti-fingerprinting properties, anti-cracking properties, among others. In some specific instances, the antiglare coating or film may be a polyester material, a polycarbonate material, or a combination material. As described above, the outer layer 408 may be a manufactured with additives such that the resulting surface includes a hardness rating that is greater than a predefined threshold. In this way, the cover component 402 may have an outer surface that is resistant to scratches.

In this example, the single layer multi-touch pattern 412 may be formed by coating the top surface of the second substrate 414 with a conductive material and selectively etching the touch pattern 412 from the conductive material, gluing or laminating a metal mesh or pre-formed touch pattern 412 to the top surface of the second substrate 414, or directly printing the touch pattern 412 onto the top surface of the second substrate 414. In some specific implementations, an index matching layer 416 may be incorporated into the cover component 402 between the touch pattern 412 and the substrate 414 to further improve the optical qualities of the display stack 102. For example, the index matching layer 416 may be formed from a material tuned to ensure that a resulting color of the display stack 102 viewed by a user is correct. In some specific examples, the index matching layer 416 may be formed from a layer of OCA (such as a silicone LOCA) having desired reflective index, color, tint, and/or ultra-violate (UV) properties or a material manufactured with additives, such a UV-adsorbing dye.

The first substrate 410 and the second substrate 414 may be laminated together to form the completed cover component 402. For example, the first and second substrates 414 may be lamented via processes, such as applying heat and/or pressure to permanently join the first substrate 410 and the second substrates 414 and/or an adhesive (such as an OCA) may be applied between the first and second substrate and UV-cured or hardened. In some instances, the first substrate 410 and the second substrates 414 may be a substantially clear glass or plastic material. In one particular instance, the first substrate 410 may be a glass substrate and the second substrate may be a plastic substrate or vice versa. If the first substrate 410 and the second substrates 414 are formed from a plastic, the cover component 402 may become flexible, such that the cover component 402 may be integrated into a curved or flexible display. For example, to form a display being at least somewhat depressible for receiving user inputs in a manner other than via a touch sensor.

In the illustrated example, the display stack 102 also includes the front or back light component 404, which generally incorporates a lightguide 418 connected to a light source 420 surrounded on the top and bottom by a layer of OCA 422 and 424, as described above with respect to FIGS. 2 and 3. The lightguide 418 may include a substrate (not shown) formed from a transparent thermoplastic (such as PMMA), a layer of lacquer and multiple grating elements that function to propagate light from the light source 420 towards the top surface of the display stack 102, thus illuminating the content presented on the display. The layers of OCA 422 and 424 reside above and below the lightguide 418 to help maintain the light generated by the light source 420 within the lightguide 418, as well as to join the cover component 402 and the display component 406 with the front or back light component 404.

In the illustrated example, the front or back light component 404 resides atop the display component 406, which includes a substrate 426 and FPL 428. In some instances, the FPL 428 includes e-ink capsules, as well as the fluid in which the capsules move up or down in as described above with reference to electronic-paper displays. In addition, the FPL 428 may include a plastic film structure onto which the e-ink is coated using a roll-to-roll process. Thereafter, a conductive transparent electrode plastic film may be combined with an adhesive layer and a release sheet to form one implementation of the FPL 428.

Figure 5:
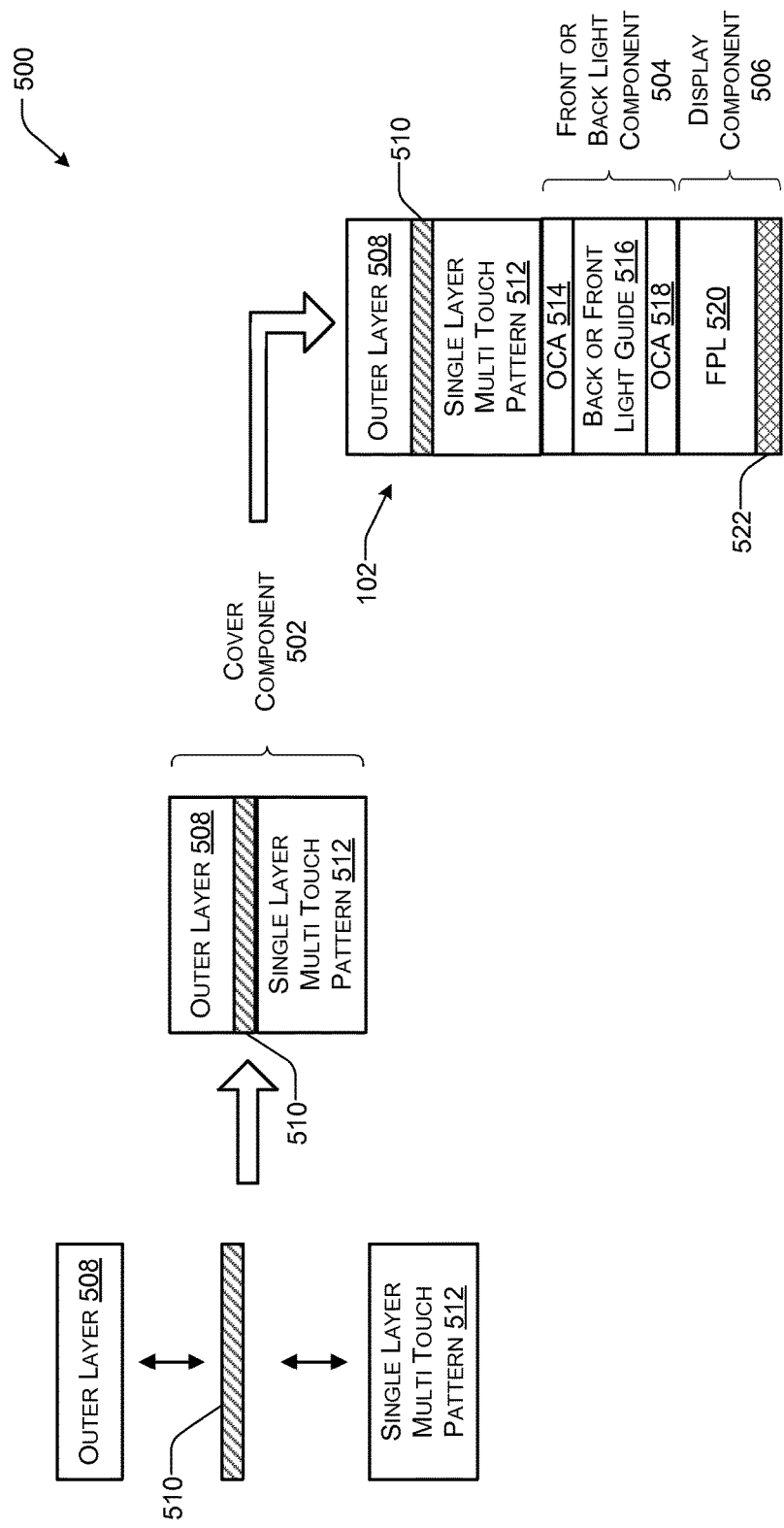
FIG. 5 illustrates an example process to produce a cover component of a display stack of FIGS. 1-4.

FIG. 5 illustrates an example process 500 to produce a cover component of a display stack, such as display stack 102 of FIGS. 1-3. In an implementation, the process 500 includes forming a display stack 102 from a cover component 502, a front or back light component 504, and a display component 506. In general, the cover component 502 includes an outer layer 508 (or antiglare layer), a substrate 510 and a single layer multi-touch pattern 512. The substrate 510 may be formed from a substantially clear glass or a substantially clear plastic depending on the intended purpose of the display. For example, the cover component 502 may become flexible if a plastic substrate is utilized, while the optical quality of the resulting display may be improved by utilizing a glass substrate. In some instances, the plastic substrate 510 may be manufactured in the range of 0.2-0.25 mm in width, while glass substrates 510 may be manufactured with a width of substantially 0.5 mm.

In the illustrated example, the outer layer 508 is applied to a top surface of a substrate 510. For example, the top surface of the substrate 510 may be coated with a material having antiglare proprieties in addition to antireflective properties, anti-smudging or anti-fingerprinting properties, anti-cracking properties, among others that may be cooled or UV-cured. In other examples, an antiglare film may be adhered to the top surface of the substrate 510, for instance, using an OCA, LOCA, or SOCA. In some other examples, the outer layer 508 may be formed by applying multiple alternating layers (coatings or films) of transparent material having contrasting refractive indexes to the top surface of the substrate 510.

In some specific instances, the antiglare film may be a polyester material, a polycarbonate material, or a combination material. In some instances, the outer layer 508 may be a manufactured with additives such that the resulting surface includes a hardness rating that is greater than a predefined threshold. In this way, the cover component 502 may have an outer surface that is resistant to scratches caused by objects having a hardness rating less than the predefined threshold (e.g., at least a hardness rating that is resistant to a 3h pencil). In other instances, the outer layer 508 may include an UV filter, a UV-absorbing dye, or the like, for protecting components in the display stack 102 from UV light.

The single layer multi-touch pattern 512 may be formed by coating the bottom surface of the substrate 510 with a conductive material and selectively etching the touch pattern 512 from the coating, gluing or adhering a metal mesh or pre-formed touch pattern 512 to the bottom surface of the substrate 510, or the touch pattern 512 may be printed using a conductive ink upon the bottom surface of the substrate 510. For instance, in some implementations, the single layer multi-touch pattern 512 may be plasma etched by shooting a high-speed stream of plasma or gas mixture into the conducive material such that the conductive material reacts chemically with at least a portion of the conductive material, mechanically milled or removed (e.g., with a high speed spindle), or laser etched in manner according to the desired pattern, e.g., a diamond or grid. In other implementations, conductive ink may be applied or printed on the bottom surface of the substrate 510 to form the touch pattern 512. For example, some known electronic printing techniques include screen printing, flexography, gravure, offset lithography, stencil printing, and/or inkjet printing. In some particular implications, the touch pattern 512 may be pre-formed, such as a metal mesh, silver nanowire, or carbon nanotube structure that may be adhered to the bottom surface of the substrate 510. For instance, the pre-formed touch pattern may be joined to the bottom surface of the substrate using an OCA. In one particular example, a LOCA may be utilized to seal or fill the gaps in the touch pattern 512. The touch pattern 512 may include traces made from ITO, copper, printed ink, metal mesh technologies, sliver nanowires, carbon nanotubes, or the like applied to a bottom surface of the substrate 510. In some instances, the single layer multi-touch pattern 512 may include a transparent conductor other than, or in addition to those described above.

Once the cover component 502 is formed, the cover component 502 may be joined atop of the front or back light component 504 including a first layer of OCA 514, a back or front light guide 516, and a second layer of OCA 518 and the display component 506 including a FPL 520 and a substrate 522. For example, in some implementations, an OCA 514 may be dispensed onto the top surface of the back or front light guide 516 (for example, via use of a roller) and the bottom surface of the cover component 502 may be contacted with the OCA 514 at a temperature included in a range of about 10° C. to about 40° C. The OCA 514 may then be cured by exposing the OCA 514 to a heat source, moisture, or UV radiation. In other implementations, the cover component 502 and the front or back light component 504 may be joined using a lamination process. For example, a vacuum lamination process at a pressure included in a range of about 10 Pascal (Pa) to about 100 Pa may be used to join the cover component 502 and the front or back light component 504.

Figure 6:
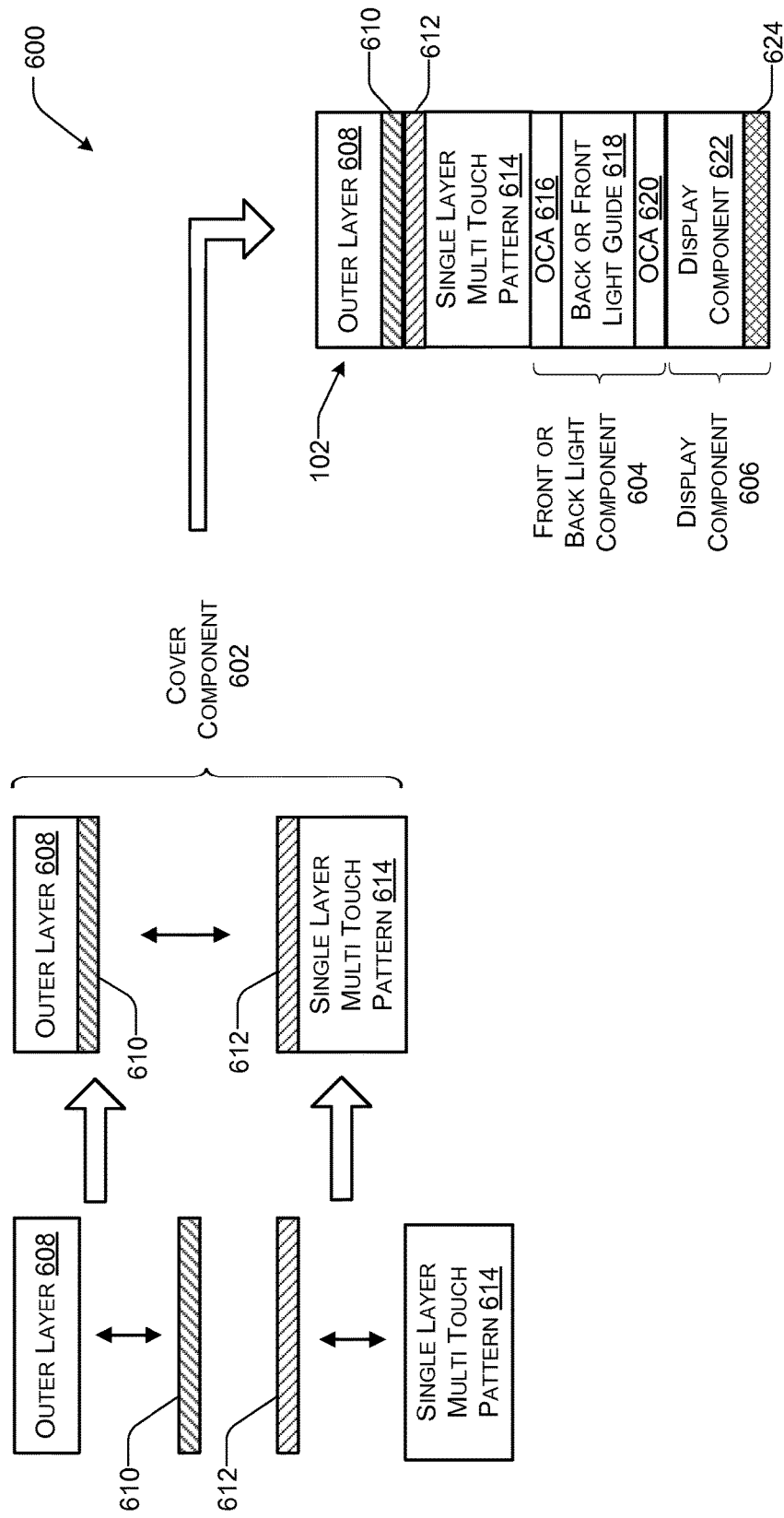
FIG. 6 illustrates another example process to produce a cover component of the display stack of FIGS. 1-4.

FIG. 6 illustrates another example flow diagram showing an illustrative process 600 for forming the cover component 602 of the display stack of FIGS. 1-3. In an implementation, the process 600 includes forming a display stack 102 from a cover component 602, a front or back light component 604, and a display component 606. In general, the cover component 602 includes an outer layer 608 (or antiglare layer), a first substrate 610, a second substrate 612 and a single layer multi-touch pattern 614. The substrates 610 and 612 may be formed from a substantially clear glass or a substantially clear plastic depending on the intended purpose of the display. In some cases, the first substrate 610 may be glass, while the second substrate 612 may be plastic or vice versa.

In the illustrated example, the outer layer 608 may be applied to a top surface of the first substrate 610. For example, the top surface of the first substrate 610 may be coated with a material having antiglare proprieties in addition to antireflective properties, anti-smudging or anti-fingerprinting properties, anti-cracking properties, among others which may be cooled or UV-cured. In other examples, an antiglare film may be adhered to the top surface of the first substrate 610, for instance, using an OCA, LOCA, or SOCA. In some other examples, the outer layer 608 may be formed by applying or laminating multiple alternating layers (coatings or films) of transparent material having contrasting refractive indexes to the top surface of the first substrate 610. For instance, In some specific instances, the antiglare film may be a polyester material, a polycarbonate material, or a combination material. In some instances, the outer layer 608 may be a manufactured with additives such that the resulting surface includes a hardness rating that is greater than a predefined threshold. In this way, the cover component 602 may have an outer surface that is resistant to scratches caused by objects having a hardness rating less than the predefined threshold (e.g., at least a hardness rating that is resistant to a 3h pencil). In other instances, the outer layer 608 may include an ultra-violate (UV) filter, a UV-absorbing dye, or the like, for protecting components in the display stack 102 from UV light.

The single layer multi-touch pattern 614 may be formed by coating the bottom surface of the second substrate 612 with a conductive material and selectively etching the touch pattern 614 from the coating, gluing or laminating a metal mesh or pre-formed touch pattern 614 to the bottom surface of second substrate 612, or the touch pattern 614 may be printed using a conductive ink upon the bottom surface of the second substrate 612. For instance, in some implementations, the single layer multi-touch pattern 614 may be plasma etched by shooting a high-speed stream of plasma or gas mixture into the conducive material such that the conductive material reacts chemically with at least a portion of the conductive material, mechanically milled or removed (e.g., with a high speed spindle), or laser etched in manner according to the desired pattern, e.g., a diamond or grid. In other implementations, conductive ink may be applied or printed on the bottom surface of the second substrate 612 to form the touch pattern 614. For example, some known electronic printing techniques include screen printing, flexography, gravure, offset lithography, stencil printing, and/or inkjet printing. In some particular implications, the touch pattern 614 may be performed, such as a metal mesh, silver nanowire, or carbon nanotube structure that may be adhered to the bottom surface of the second substrate 612, for instance, by filling the gaps in the touch pattern 614 with an LOCA and then UV-curing the LOCA. The touch pattern 614 may include traces made from ITO, copper, printed ink, metal mesh technologies, sliver nanowires, carbon nanotubes, or the like applied to a bottom surface of the second substrate 612. In some instances, the single layer multi-touch pattern 614 may include a transparent conductor other than, or in addition to those described above.

The cover component 602 may be completed by lamenting the first and second substrates 610 and 612 together or applying an adhesive layer between the first and second substrates 610 and 612. For example, the first substrate 610 and the second substrate 612 may be combined using a roll-to-roll lamination process performed at a temperature included in a range of about 15° C. to about 40° C. In another example, the first substrate 610 and the second substrate 612 may be combined using a vacuum lamination process. In some instances, the lamination process may have a duration included in a range of about 40 seconds to 118 seconds or in a range of about 70 seconds to 90 seconds. In other examples, an adhesive film (e.g., a SOCA) or a LOCA may be applied between the first and second substrates 610 and 612. In some instances, the adhesive film may be cut before being contacted with the first and second substrates 610 and 612. In some implementations, the adhesive may be applied with pressure included in a range of about 10 Pa to 300 Pa. In other implementations, the adhesive may be contacted with the first and second substrates 610 and 612 a pressure included in a range of about 25 Pa to about 100 Pa.

In some implementations, the cover component 602 may be produced using a module edge press operation at a pressure included in a range of about 100 MPa to about 300 MPa for a duration included in a range of about 5 seconds to about 40 seconds at a temperature included in a range of about 50° C. to about 75° C. The module edge press operation may be performed, in some cases, after the outer layer 608 and the first substrate 610 and the touch pattern 614 and the second substrate 612 are formed. Additionally, the cover component 602 may be produced by applying an external force to the one or more of the first substrate 610 or the second substrate 612. In some implementations, the external force may be applied, while heat is also applied.

Once the cover component 602 is formed, the cover component 602 may be joined atop of the front or back light component 604 including a first layer of OCA 616, a back or front light guide 618, and a second layer of OCA 620 and the display component 506 including a FPL 622 and a substrate 624. For example, in some implementations, an OCA 616 may be dispensed onto the top surface of the back or front light guide 618 (for example, via use of a roller) and the bottom surface of the cover component 602 may then be contacted with the OCA 616. The OCA 616 may be cured by exposing the OCA 616 to a heat source, moisture, or UV radiation. In other implementations, the cover component 602 and the front or back light component 604 may be joined using a lamination process.

Figure 7:
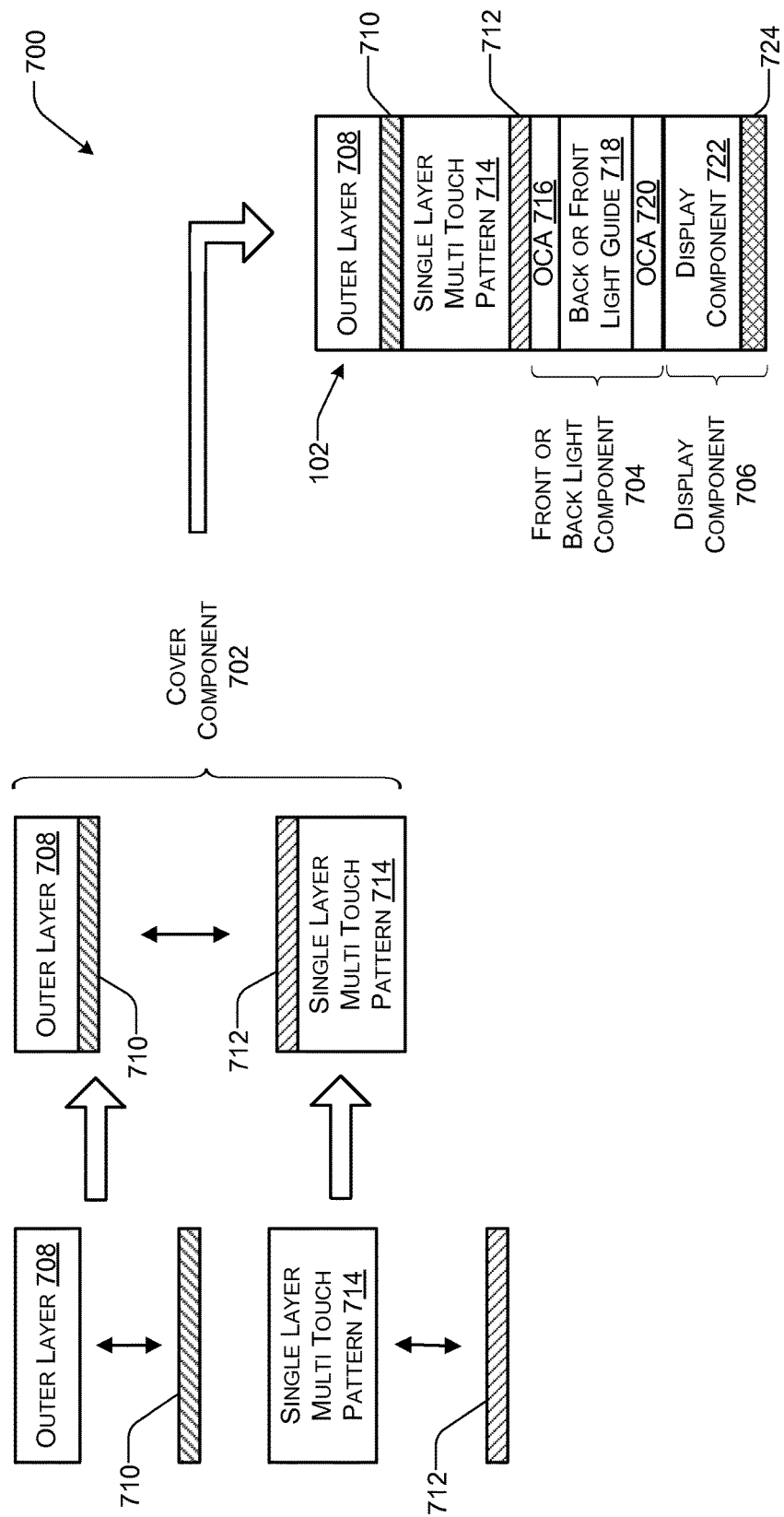
FIG. 7 illustrates another example process to produce a cover component of the display stack of FIGS. 1-4.

FIG. 7 illustrates another example flow diagram showing an illustrative process 700 for forming the cover component 702 of the display stack of FIGS. 1-4. In an implementation, the process 700 includes forming a display stack 102 from a cover component 702, a front or back light component 704, and a display component 706. In general, the cover component 702 includes an outer layer 708 (or antiglare layer), a first substrate 710, a second substrate 712 and a single layer multi-touch pattern 714. The substrates 710 and 712 may be formed from a substantially clear glass or a substantially clear plastic depending on the intended purpose of the display. In some cases, the first substrate 710 may be glass, while the second substrate 712 may be plastic or vice versa.

In the illustrated example, the outer layer 708 may be applied to a top surface of the first substrate 710. For example, the top surface of the first substrate 610 may be coated with a material having antiglare proprieties in addition to antireflective properties, anti-smudging or anti-fingerprinting properties, anti-cracking properties, among others which may be cooled or UV-cured. In other examples, an antiglare film may be adhered to the top surface of the first substrate 710, for instance, using an OCA, LOCA, or SOCA. In some other examples, the outer layer 708 may be formed by applying or laminating multiple alternating layers (coatings or films) of transparent material having contrasting refractive indexes to the top surface of the first substrate 710. For instance, In some specific instances, the antiglare film may be a polyester material, a polycarbonate material, or a combination material. In some instances, the outer layer 708 may be a manufactured with additives such that the resulting surface includes a hardness rating that is greater than a predefined threshold. In this way, the cover component 702 may have an outer surface that is resistant to scratches caused by objects having a hardness rating less than the predefined threshold (e.g., at least a hardness rating that is resistant to a 3h pencil). In other instances, the outer layer 708 may include an ultra-violate (UV) filter, a UV-absorbing dye, or the like, for protecting components in the display stack 102 from UV light.

The single layer multi-touch pattern 714 may be formed by coating the top surface of the second substrate 712 with a conductive material and selectively etching the touch pattern 714 from the coating, gluing or laminating a metal mesh or pre-formed touch pattern 714 to the top surface of second substrate 712, or the touch pattern 714 may be printed using a conductive ink upon the top surface of the second substrate 712. For instance, in some implementations, the single layer multi-touch pattern 614 may be plasma etched by shooting a high-speed stream of plasma or gas mixture into the conducive material such that the conductive material reacts chemically with at least a portion of the conductive material, mechanically milled or removed (e.g., with a high speed spindle), or laser etched in manner according to the desired pattern, e.g., a diamond or grid. In other implementations, conductive ink may be applied or printed on the bottom surface of the second substrate 712 to form the touch pattern 714. For example, some known electronic printing techniques include screen printing, flexography, gravure, offset lithography, stencil printing, and/or inkjet printing. In some particular implications, the touch pattern 714 may be performed, such as a metal mesh, silver nanowire, or carbon nanotube structure that may be adhered to the bottom surface of the second substrate 712, for instance, by filling the gaps in the touch pattern 714 with an LOCA and then UV-curing the LOCA. The touch pattern 714 may include traces made from ITO, copper, printed ink, metal mesh technologies, sliver nanowires, carbon nanotubes, or the like applied to a bottom surface of the second substrate 712. In some instances, the single layer multi-touch pattern 714 may include a transparent conductor other than, or in addition to those described above.

The cover component 702 may be completed by lamenting the first and second substrates 710 and 712 together or applying an adhesive layer between the first and second substrates 710 and 712. For example, as described above, the first substrate 710 and the second substrate 712 may be combined using a roll-to-roll lamination process performed at a temperature included in a range of about 15° C. to about 50° C. In another example, the first substrate 710 and the second substrate 712 may be combined using a vacuum lamination process. In some instances, the lamination process may have a duration included in a range of about 50 seconds to 118 seconds or in a range of about 80 seconds to 90 seconds. In other examples, an adhesive film (e.g., a SOCA) or a LOCA may be applied between the first and second substrates 610 and 612. In some instances, the adhesive film may be cut before being contacted with the first and second substrates 710 and 712. In some implementations, the adhesive may be applied with pressure included in a range of about 10 Pa to 300 Pa. In other implementations, the adhesive may be contacted with the first and second substrates 710 and 712 a pressure included in a range of about 25 Pa to about 100 Pa.

In some implementations, the cover component 702 may be produced using a module edge press operation at a pressure included in a range of about 100 MPa to about 300 MPa for a duration included in a range of about 5 seconds to about 50 seconds at a temperature included in a range of about 60° C. to about 75° C. The module edge press operation may be performed, in some cases, after the outer layer 708 and the first substrate 710 and the touch pattern 714 and the second substrate 712 are formed. Additionally, the cover component 702 may be produced by applying an external force to the one or more of the first substrate 710 or the second substrate 712. In some implementations, the external force may be applied, while heat is also applied.

Once the cover component 702 is formed, the cover component 702 may be joined atop of the front or back light component 704 including a first layer of OCA 616, a back or front light guide 718, and a second layer of OCA 720 and the display component 706 including a FPL 722 and a substrate 724. For example, in some implementations, an OCA 716 may be dispensed onto the top surface of the back or front light guide 718 (for example, via use of a roller) and the bottom surface of the cover component 702 may then be contacted with the OCA 716. The OCA 716 may be cured by exposing the OCA 716 to a heat source, moisture, or UV radiation. In other implementations, the cover component 702 and the front or back light component 704 may be joined using a lamination process.

Figure 8:
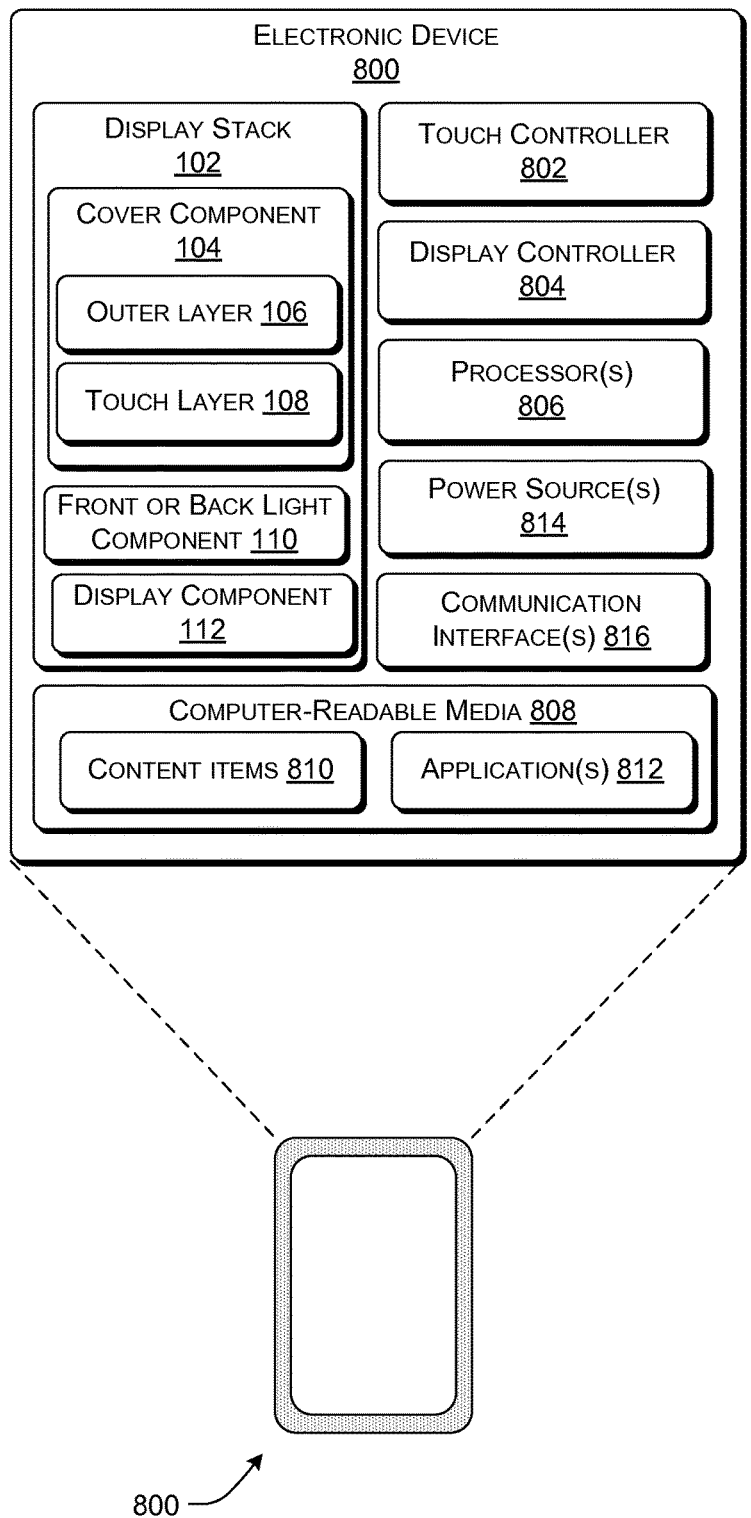
FIG. 8 illustrates an example electronic device including the display stack with the cover component having the antiglare layer and the touch component of FIG. 1.

FIG. 8 illustrates an example electronic device 800 including the display stack 102 with the cover component 104 having the outer layer 106 and the touch layer 108 of FIG. 1. The device 800 may comprise any type of mobile electronic device (e.g., an electronic book reader, a tablet computing device, a laptop computer, a multifunction communication device, a portable digital assistant (PDA), etc.) or non-mobile electronic device (e.g., a desktop computer, a television, etc.). In addition, while FIG. 8 illustrates several example components of the electronic device 800, it should be appreciated that the device 800 may also include other conventional components, such as an operating system, system busses, input/output components, and the like.

In general, the display stack 102 includes a cover component 104, a front or back light component 110, and a display component 112. In one implementation, the cover component 104 includes at least one substantially transparent substrate, the outer layer 106, and the touch layer 108. In one implementing, the outer layer 106 is formed by applying an antiglare coating or film to a top surface of a substrate and the touch layer is formed by coating a bottom surface of the substrate with a conductive material and selectively etching the touch pattern from the conductive material. In other examples, the touch pattern may be a conductive metal mesh technology that may be adhered to the bottom surface of the substrate.

In another implementation, the cover component 104 may be formed from a first portion including a first substrate and the outer layer 106 and a second portion including a second substrate and the touch layer 108. For example, the first portion may be formed by applying the antiglare coating or film to a top surface of the first substrate and the second portion may be formed by coating and etching a touch pattern from a bottom surface of the second substrate. The cover component 104 may be fashioned by lamenting the first portion and the second portion together, such that the cover component 104 includes from top surface of the electronic device 800 down: the outer layer 106, a first substrate, the second substrate, and the touch layer 108.

In some examples, the antiglare coating or film may have antiglare proprieties, antireflective properties, anti-smudging or anti-fingerprinting properties, anti-cracking properties, among others. In some specific instances, the antiglare coating or film may be a polyester material, a polycarbonate material, or a combination material. In some instances, the outer layer 106 may be a film manufactured with additives such that the resulting film includes a hardness rating that is greater than a predefined threshold. In this way, the cover component 104 may have an outer surface that is resistant to scratches caused by objects having a hardness rating less than the predefined threshold (e.g., at least a hardness rating that is resistant to a 3h pencil). In other instances, the outer layer 106 may include an ultra-violate (UV) filter, a UV-absorbing dye, or the like, for protecting components in the display stack 102 from UV light.

In some examples, the touch layer 108 may be formed from a copper or copper-based alloy, silicon or a silicon-based alloy, gold or a gold-based alloy, sliver a sliver-based alloy, carbon or a carbon-based alloy, among others. In some particular examples, the touch layer may be formed from Indium tin oxide (ITO), carbon nanotubes, and/or silver nanowiring. For instance, the bottom surface of the substrate may be coated or sprayed with the selected conductive material and a touch pattern, such as a single layer touch pattern, may be etched from the resulting material. In other examples, the conductive material forming the touch layer 108 may be printed upon the bottom surface of the substrate or a metal mesh or wiring may be adhered to or traced on the bottom surface of the substrate to form the touch layer 108.

In general, a touch controller 802 may be utilized in combination with the touch layer 108 to form a touch-sensitive display stack 102. Thus, the display stack 102 may be capable of both accepting user touch input and rendering content in response to or corresponding to the touch input. As several examples, the touch layer 108 and the touch controller 802 may together form a capacitive touch sensor incorporated into the display stack 102, a force sensitive resistance (FSR) sensor, an interpolating force sensitive resistance (IFSR) sensor, or any other type of touch sensor. In this manner, the display stack 102 may provide a touch-sensitive display capable of detecting user inputs as well as displaying content. In some instances, the touch sensor may be capable of determining an amount of pressure or force associated with a touch input.

In some instances, the substrate may be formed from a clear glass. In other instances, the substrate may be formed from a substantially clear plastic. In the instance that the substrate is formed from a substantially clear plastic, the cover component 104 may be flexible, such that the cover component 104 may be integrated into a curved display. For example, in addition the enhanced flexibility provided by the inherent properties of the plastic material, a plastic substrate may be manufactured in the range of 0.2-0.25 mm in width. Similar glass substrates typically have a width of 0.5 mm. Further, the overall flexibility of the cover component 104 may be improved by utilizing a single substrate and/or a single layer multi-touch pattern, as described herein.

The display stack 102 also includes a display component 112 and a corresponding display controller 804. For instance, the display stack 102 may include a display component 112 that may present content via one or more image producing technologies. In various examples, the display component 112 may include a reflective display, such as an electronic paper display, a reflective LCD, or the like. Electronic paper displays represent an array of display technologies that can mimic the look of ordinary ink on paper. In contrast to backlit displays, electronic paper displays typically reflect light, much as ordinary paper does. In addition, electronic paper displays can be bi-stable, meaning that these displays are capable of holding text or other rendered images even when very little or no power is supplied to the display. Some examples of the display component 112 that may be used with the implementations described herein include bi-stable LCDs, MEMS displays, such as interferometric modulator displays, cholesteric displays, electrophoretic displays, electrofluidic pixel displays, electrowetting displays, photonic ink displays, gyricon displays, and the like. In other implementations, or for other types of electronic devices 800, the display component 112 may include an active display such as a LCD, a plasma display, a LED display, an OLED display, and so forth. Accordingly, implementations herein are not limited to any particular display technology.

In one implementation, the display component 112 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display component 112 comprises an electrophoretic display that includes oppositely charged light and dark particles. In order to create white, the display controller 804 can move light particles to the front side of the display component 112 by creating a corresponding charge at an electrode near the front of the display component 112 and moves the dark particles to the back of the display component 112 by creating a corresponding charge at an electrode near the back. In order to create black, meanwhile, the display controller 804 changes the polarities and moves the dark particles to the front of the display component 112 and the light particles to the back of the display component 112. Furthermore, to create varying shades of gray, the display controller 804 may utilize different arrays of both light and dark particles. In some cases, the particles may be contained in individual transparent capsules. In a particular example, the capsules can have a diameter included in a range of 35 micrometers to 45 micrometers. The capsules can be suspended in a fluid, such as a liquid polymer, between a transparent upper electrode grid layer and a lower electrode grid layer separated by a gap of approximately 50 micrometers to 200 micrometers.

In still another implementation, the display component 112 may include an electrowetting display that employs an applied voltage to change the surface tension of a liquid in relation to a surface. For instance, by applying a voltage to a hydrophobic surface, the wetting properties of the surface may be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCDs makes the technology suitable for displaying content on portable devices that rely on battery power.

While several different examples have been given, the reflective displays described herein can comprise any other type of electronic-paper technology or reflective-display technology. In addition, while some of the examples described above are discussed as rendering black, white, and varying shades of gray, the described techniques can also apply to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display component 112 may represent a backlit display, examples of which are mentioned above.

The electronic device 800 may also include a front or back light component 110 for lighting the display stack 102. The front or back light component 110 may include a light guide portion and a light source. The light guide portion can include a substrate including a transparent thermoplastic polymer. For example, the light guide portion can include an acrylic polymer. In one implementation, the light guide portion can include polymethylmethacrylate (PMMA). In a particular implementation, the light guide portion can include a substrate, a layer of lacquer and multiple grating elements formed in the layer of lacquer. The multiple grating elements may be configured to propagate light to illuminate the display component 112.

The front or back light component 110 may reside atop the display component 102 and coupled to a bottom surface of the cover component 104 via OCA, such as a solid OCA (SOCA) or a liquid OCA (LOCA). In the latter instances, the device 800 may be assembled by placing the LOCA atop the display component 112 and, UV-curing the LOCA on the corners and/or the portion of the perimeter. Thereafter, the remaining LOCA may be UV-cured and the front light 110 may couple to the LOCA. By again curing the corner(s) and/or perimeter, the techniques effectively create a barrier for the remaining LOCA and also prevent the formation of air gaps in the LOCA layer, thereby increasing the efficacy of the front light 110. In other implementations, the LOCA may be placed near a center and pressed outwards towards a perimeter of the display stack 102 while curing.

The electronic device 800 also includes one or more processors 806 and computer-readable media 808. Depending on the configuration of the electronic device 800, the computer-readable media 808 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 806.

The computer-readable media 808 may be used to store any number of functional components that are executable on the processors 806, as well content items 810 and applications 812. Thus, the computer-readable media 808 may include an operating system and a storage database to store one or more content items, such as eBooks, audio books, songs, videos, still images, and the like. The computer-readable media 808 of the electronic device 800 may also store one or more content presentation applications to render content on the device 800. The content presentation applications may be implemented as various applications 812 depending upon the content items 810. For instance, one of the applications 812 may be an electronic book reader application for rending textual electronic books, an audio player for playing audio books or songs, a video player for playing video, and so forth.

Figure 10:
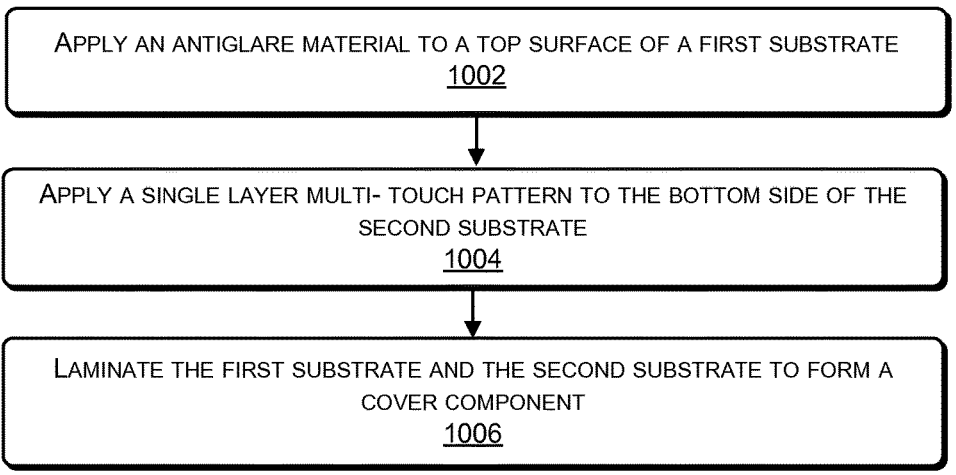
FIG. 10 illustrates another example flow diagram showing an illustrative process for forming the cover component of the display stack of FIGS. 1-3.

The electronic device 800 may also includes one or more power sources 814 for providing power to the display stack 102 and one or more communication interfaces 816 to facilitate communication between one or more networks (such as the Internet® or one or more local area networks) and/or directly with one or more devices. The communication interfaces 816 may also facilitate communication between one or more wireless access points, a master device, and/or one or more other computing devices as part of an ad-hoc or home network system. The communication interfaces 816 may support both wired and wireless connection to various networks, such as cellular networks, radio, WiFi networks, short-range or near-field networks (e.g., Bluetooth®), infrared signals, local area networks, wide area networks, the Internet, and so forth. FIGS. 9 and 10 are flow diagrams illustrating example processes for generating a cover component as described herein. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 9 illustrates an example flow diagram showing an illustrative process 900 for forming the cover component of the display stack of FIGS. 1-4. For example, a display stack may include a cover component, a front or back light component, and a display component. In general, the cover component includes an outer layer (or antiglare layer), a substrate and a single layer multi-touch pattern. The substrate may be formed from a substantially clear glass or a substantially clear plastic depending on the intended purpose of the display cover. For example, the cover component may become flexible if a plastic substrate is utilized, while the optical quality of the resulting display may be improved by utilizing a glass substrate. In some instances, the plastic substrate may be manufactured in the range of 0.2-0.25 mm in width, while glass substrates may be manufactured with a width of substantially 0.5 mm.

At 902, an antiglare material is applied to a first side of the substrate. For example, a top surface of the substrate may be coated with a material having antiglare proprieties in addition to antireflective properties, anti-smudging or anti-fingerprinting properties, anti-cracking properties, among others that may be cooled or UV-cured. In other examples, an antiglare film may be adhered to the top surface of the substrate, for instance, using an OCA, LOCA, or SOCA. In some other examples, the antiglare material may be formed by applying multiple alternating layers (coatings or films) of transparent material having contrasting refractive indexes onto the top surface of the substrate.

In some specific instances, the antiglare material may be a polyester material, a polycarbonate material, or a combination material. In some instances, the antiglare material may be a manufactured with additives such that the resulting surface includes a hardness rating that is greater than a predefined threshold. In this way, the cover component may have an outer surface that is resistant to scratches caused by objects having a hardness rating less than the predefined threshold (e.g., at least a hardness rating that is resistant to a 3h pencil).

At 904, a conductive material may be applied to a second side of the substrate. For example, the conductive material may be applied by dipping or spraying a bottom surface of the substrate with a conductive material, such as a copper or copper-based alloy, silicon or a silicon-based alloy, gold or a gold-based alloy, sliver a sliver-based alloy, carbon or a carbon-based alloy, among others. In some particular examples, the touch layer may be formed from Indium tin oxide (ITO).

At 906, the single layer multi-touch pattern may be etched from the conductive material applied to the second side of the substrate. For example, the touch pattern may be plasma etched by shooting a high-speed stream of plasma or gas mixture into the conducive material such that the conductive material reacts chemically with at least a portion of the conductive material, mechanically milled or removed (e.g., with a high speed spindle), or laser etched in manner according to the desired pattern, e.g., a diamond or grid.

FIG. 10 illustrates another example flow diagram showing an illustrative process 1000 for forming the cover component of the display stack of FIGS. 1-4. In an implementation, a display stack includes a cover component, a front or back light component, and a display component. In general, the cover component includes an outer layer (or antiglare layer), a first substrate, a second substrate, and a single layer multi-touch pattern.

At 1002, an antiglare material is applied to the top surface of the first substrate. For example, the top surface of the first substrate may be coated with a material having antiglare proprieties in addition to antireflective properties, anti-smudging or anti-fingerprinting properties, anti-cracking properties, among others that may be cooled or UV-cured. In other examples, an antiglare film may be adhered to the top surface of the first substrate, for instance, using an OCA, LOCA, or SOCA. In some specific instances, the antiglare material may be a polyester material, a polycarbonate material, or a combination material. In some instances, the antiglare material may be a manufactured with additives such that the resulting surface includes a hardness rating that is greater than a predefined threshold. In this way, the cover component may have an outer surface that is resistant to scratches caused by objects having a hardness rating less than the predefined threshold (e.g., at least a hardness rating that is resistant to a 3h pencil).

At 1004, the single layer multi-touch pattern is applied to the bottom surface of the second substrate. For example, the touch pattern may be formed by coating the bottom surface of the second substrate with a conductive material and selectively etching the touch pattern from the coating, gluing or laminating a metal mesh or pre-formed touch pattern to the bottom surface of second substrate, or the printing the touch pattern on the bottom surface of the second substrate using a conductive ink.

For instance, in some implementations, the single layer multi-touch pattern may be plasma etched by shooting a high-speed stream of plasma or gas mixture into the conducive material such that the conductive material reacts chemically with at least a portion of the conductive material, mechanically milled or removed (e.g., with a high speed spindle), or laser etched in manner according to the desired pattern, e.g., a diamond or grid. In other implementations, conductive ink may be applied or printed on the bottom surface of the second substrate to form the touch pattern. For example, some known electronic printing techniques include screen printing, flexography, gravure, offset lithography, stencil printing, and/or inkjet printing. In some particular implications, the touch pattern may be performed, such as a metal mesh, silver nanowire or carbon nanotube structure, and adhered to the bottom surface of the second substrate, for instance, by filling the gaps in the touch pattern with an LOCA and then UV-curing the LOCA. The touch pattern may include traces made from ITO, copper, printed ink, metal mesh technologies, sliver nanowires, carbon nanotubes, or the like applied to a bottom surface of the second substrate. In some instances, the single layer multi-touch pattern may include a transparent conductor other than, or in addition to those described above.

At 1006, the first and second substrates may then be lamented together to form the cover component. For example, the first substrate and the second substrate may be combined using a roll-to-roll lamination process performed at a temperature included in a range of about 15° C. to about 40° C. In another example, the first substrate and the second substrate may be combined using a vacuum lamination process. In some instances, the lamination process may have a duration included in a range of about 40 seconds to 118 seconds or in a range of about 70 seconds to 90 seconds. In other examples, an adhesive film (e.g., a SOCA) or a LOCA may be utilized to join the first and second substrates. In some implementations, the adhesive may be applied with pressure included in a range of about 10 Pa to 300 Pa. In other implementations, the adhesive may be contacted with the first and second substrates at a pressure included in a range of about 25 Pa to about 100 Pa.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising;
    a display stack, the display stack including:
        a display unit to display content;
        a lightguide positioned above the display unit and configured to receive light from a light source, the light source being positioned at an edge of the lightguide; and
        a cover component positioned over the lightguide and the display unit, the cover component including:
            a transparent first substrate with a top surface and a bottom surface;
            an antiglare layer applied to the top surface of the transparent first substrate;
            a second substrate, with a top surface and a bottom surface, the top surface of the second substrate bonded directly to the bottom surface of the first substrate; and
            a multi-touch layer in contact with the bottom surface of the second substrate, the multi-touch layer including a first plurality of electrodes and a second plurality of electrodes located within a single layer.

2. The electronic device as recited in claim 1, wherein the first plurality of electrodes form rows of a touch pattern and the second plurality of electrodes form columns of a touch pattern.

3. The electronic device as recited in claim 1, further comprising an optically clear adhesive layer to bond the lightguide directly to the cover component.

4. The electronic device as recited in claim 1, wherein the multi-touch layer comprises (i) a preformed touch pattern bonded to the bottom surface of the second substrate or (ii) a touch pattern selectively etched from a conductive material contacted to the bottom surface of the second substrate.

5. The electronic device as recited in claim 1, wherein the display unit includes a front plane laminate bonded to the lightguide.

6. A display stack for an electronic device, the display stack comprising:
    a cover component including:
        a first substrate having a top surface and a bottom surface;
        an antiglare layer disposed directly on the top surface of the substrate;
        a second substrate, having a top surface and a bottom surface;
        an index matching layer, having a top surface and a bottom surface, the bottom surface of the index matching layer in contact with the top surface of the second substrate; and
        a touch layer having a top surface and a bottom surface, the bottom surface of the touch layer in contact with the top surface of the index matching layer, the touch layer including a first plurality of electrodes and a second plurality of electrodes positioned within a single layer.

7. The display stack as recited in claim 6, further comprising:
a lightguide component positioned beneath the cover component, the lightguide component configured to receive light from a light source.

8. The display stack as recited in claim 7, wherein the lightguide component has a top surface that is bonded directly to a bottom surface of the cover component via one or more of: a solid optically clear adhesive (SOCA) or a liquid optically clear adhesive (LOCA).

9. The display stack as recited in claim 6, further comprising:
a display component positioned beneath the cover component, the display component including:
a third substrate with a top surface and a bottom surface; and
a front plane laminate with a top surface and a bottom surface, the bottom surface of the front plane laminate bonded to the top surface of the third substrate.

10. The display stack as recited in claim 9, wherein the display component is bonded beneath the cover component via one or more of: a solid optically clear adhesive (SOCA) or a liquid optically clear adhesive (LOCA).

11. The display stack as recited in claim 6, wherein the touch layer comprises a preformed touch pattern and is bonded to the top surface of the index matching layer.

12. The display stack as recited in claim 6, wherein the antiglare layer is a film applied to the top surface of the substrate.

13. The display stack as recited in claim 6, wherein the touch layer includes a touch pattern having a first array of electrodes arranged in rows and a second array of electrodes arranged in columns.

14. A method comprising:
forming an antiglare layer directly over a top surface of a first substrate;
forming an index matching layer directly on a bottom surface of the first substrate;
forming a multi-touch pattern directly on a bottom surface of a second substrate, the multi-touch pattern having a first plurality of electrodes forming rows of the multi-touch pattern and a second plurality of electrodes forming columns of the multi-touch pattern within a single layer; and
contacting a bottom surface of the index matching layer to a top surface of the second substrate.

15. The method as recited in claim 14, wherein forming the multi-touch pattern comprises bonding a preformed multi-touch pattern to the bottom surface of the second substrate using an optically clear adhesive.

16. The method as recited in claim 14, wherein the contacting further comprises laminating the second substrate and the index matching layer.

17. The method as recited in claim 14, wherein the contacting further comprises bonding the index matching layer to the second substrate using an optically clear adhesive.

18. The method as recited in claim 14, wherein forming the antiglare layer comprises one of:
coating the top surface of the first substrate with an antiglare material;
applying a antiglare film to the top surface of the first substrate; or
etching a portion of the top surface of the first substrate.

19. The method as recited in claim 14, further comprising:
contacting a top surface of a lightguide component to the bottom surface of the multi-touch pattern, the lightguide component configured to receive light from a light source.

20. The method as recited in claim 14, further comprising:
contacting a top surface of a display component to the bottom surface of the multi-touch pattern.

\* \* \* \* \*